United States Patent
Hagenlocher

[11] Patent Number: 5,954,517
[45] Date of Patent: Sep. 21, 1999

[54] INTERACTIVE SAND BOX FOR TRAINING

[75] Inventor: Bernd Hagenlocher, Pichlerstr. 1, Wiernsheim, Germany, 75446

[73] Assignee: Bernd Hagenlocher, Wiernsheim, Germany

[21] Appl. No.: 08/791,726

[22] Filed: Jan. 29, 1997

[30] Foreign Application Priority Data

Dec. 10, 1996 [DE] Germany .......................... 196 51 361

[51] Int. Cl.[6] .................................................. G06F 15/00
[52] U.S. Cl. ........................ 434/365; 434/276; 434/299; 181/101; 364/468.27
[58] Field of Search .................................. 434/276, 299, 434/365; 364/468.27, 474.05; 181/101–108

[56] References Cited

U.S. PATENT DOCUMENTS

| 4,742,305 | 5/1988 | Stolarczyk ............................. 324/334 |
| 4,951,151 | 8/1990 | Sorenson et al. . |
| 5,031,120 | 7/1991 | Pomerantz et al. ................. 364/468.27 |
| 5,138,304 | 8/1992 | Bronson . |
| 5,551,881 | 9/1996 | Henderson et al. ..................... 434/299 |

FOREIGN PATENT DOCUMENTS

| 0 477 861 A2 | 4/1992 | European Pat. Off. .......... F41G 3/26 |
| WO 94/15165 | 7/1994 | WIPO ............................... F41G 3/26 |

*Primary Examiner*—Richard J. Apley
*Assistant Examiner*—Glenn E. Richman
*Attorney, Agent, or Firm*—Chapman and Cutler

[57] ABSTRACT

An interactive sand box or sand table for use in tactical training includes an automated control system and image generator so that infinitely variable visual images may be projected onto the contoured surface of the sand for training and preparation for action in the military field and disaster control, industrial planning, environmental protection, and similar situations.

17 Claims, 4 Drawing Sheets

INTERACTIVE SAND BOX FOR TRAINING

FIELD OF THE INVENTION

The present invention relates to a training device and more particularly to an interactive sand box arrangement for use in tactical training and planning, such as in preparation for military action, disaster control, or some other types of training programs.

BACKGROUND OF THE INVENTION

It is known in the prior art to provide a training device known as a sand box or sand table arrangement where a volume of sand is contained within a base structure and elevated to a height that is convenient for use. Typically, a projection device or projector is mounted above the level of the sand by a boom or similar device for projecting a selected image onto the surface of the sand. The surface of the sand may be manually or mechanically shaped or molded to provide a specific contour or shape for a specific type of training exercise. Generally, some form of control processor or CPU is used to control the functioning of the projector which projects an image onto the sand, as well as a pointer-like, light source to coordinate the contours and similar parameters projected onto the generally horizontal surface area of the sand. Various types of terrain formations may be depicted and illuminated by the projector and a control processor operating under the controller. A specific program is exercised in such a way that the beam of light exactly illuminates the intersections of specific coordinates which have been input via a control panel. A sand box of this type is described in European Patent Application No. 413, 945 A2.

Although existing projectors can be used to project various still images and training situations for training personnel on the surface of the sand, the depiction of training exercises to be simulated is often not adequate for all requirements. In particular, depictions of terrain with moving images, such as columns of vehicles, troop movements, clouds, fires, change in the operational situation and/or of the terrain, and the like, cannot be adequately depicted.

SUMMARY OF THE INVENTION

Therefore, there is a need to develop a sand box for training which expands the flexibility and range of applications of prior art sand boxes of this type.

The object of the present invention, therefore, is to provide an improved sand box by incorporating the ability to project moving images from various types of readable data media in a manually or automated variable manner onto the generally horizontal surface of the sand which has been shaped to correspond to a particular terrain formation or contour.

In accordance with the preferred embodiment of this invention, the sand table arrangement includes a base structure for supporting a volume of sand at a convenient level, a projector for projecting images on the surface of the sand, a dot light source and a control processor. This combination permits the upper surface of the volume of sand to be shaped or contoured to correspond to a particular terrain formation to be depicted. A stationary deflecting mirror is mounted above the sand table surface and inclined at an angle so that images projected by a projector are optically reflected onto the effective surface area of the sand. A computer controlled image generating device, such as a liquid crystal display unit, or the like, provides an image to the projector to visually depict on the surface of the sand. Images may be projected onto the surface of the sand from computer readable media to provide image depictions, data and aiming points that are projected onto the surface of the sand. At least one control panel, such as a keyboard, joy stick, or the like, is provided so that the image depictions, data, aiming points, and other information to be generated can be manually input and/or combined with data read from the recording media which can be automatically or manually varied. The training sand box made in accordance with this invention includes a combination of an overhead projector and an LCD unit for providing electronically controllable image sources for depiction of still or moving pictures, such as, for example, terrain formations, self-propelled or moving vehicles, and the like, and the use of a CPU, such as a personal computer for controlling and driving the LCD unit, provides a substantial number of advantages. Therefore, it is possible to depict many types of image representations, such as terrain, operational areas, disaster areas, and the like, which can be represented by moving pictures, or sequences of movements, including vehicles, marching columns, and the like. Symbols of all kinds, by use of the computer-driven LCD unit, can be used to depict in a simple, manual or automatic manner and projected onto the surface of the sand to any desired scale and the particular image being projected can simultaneously be displayed on a conventional CRT or video monitor.

It can be seen that as the projection surface is modulated and contoured on the training sand box, images and depictions appear in perspective or three-dimensional views which lead to a very realistic and convincing depiction.

In this invention, it is therefore possible, simply by changing the software, which is stored on diskettes, compact disks, CD-ROMS, or the like, to use the training sand box as a platform for planning and visual demonstration for various activities, such as military training, planning for industry, forestry and agricultural uses, for environmental protection, for fire-fighting training, preparatory training of police or armed forces, technical relief organizations, for rescue services or disaster control, and the like, without the requirement of changing any hardware. Furthermore, a cursor is provided so that symbols or markings of any type can be displayed or projected over the whole image area, if desired.

The application or use in accordance with this invention of an electronically controllable liquid crystal display unit as the image display permits extensive flexibility in the types of images that can be depicted from the information stored on data media and projected onto the effective surface area of the sand. Thereby, a very realistic training scenario can be provided. The training sand box provides a computer assisted, multi-role simulation device.

BRIEF DESCRIPTION OF THE DRAWINGS

The present invention is described below with reference to the following diagrams or drawings, which show.

DETAILED DESCRIPTION OF THE PREFERRED EMBODIMENT

Figure 1:
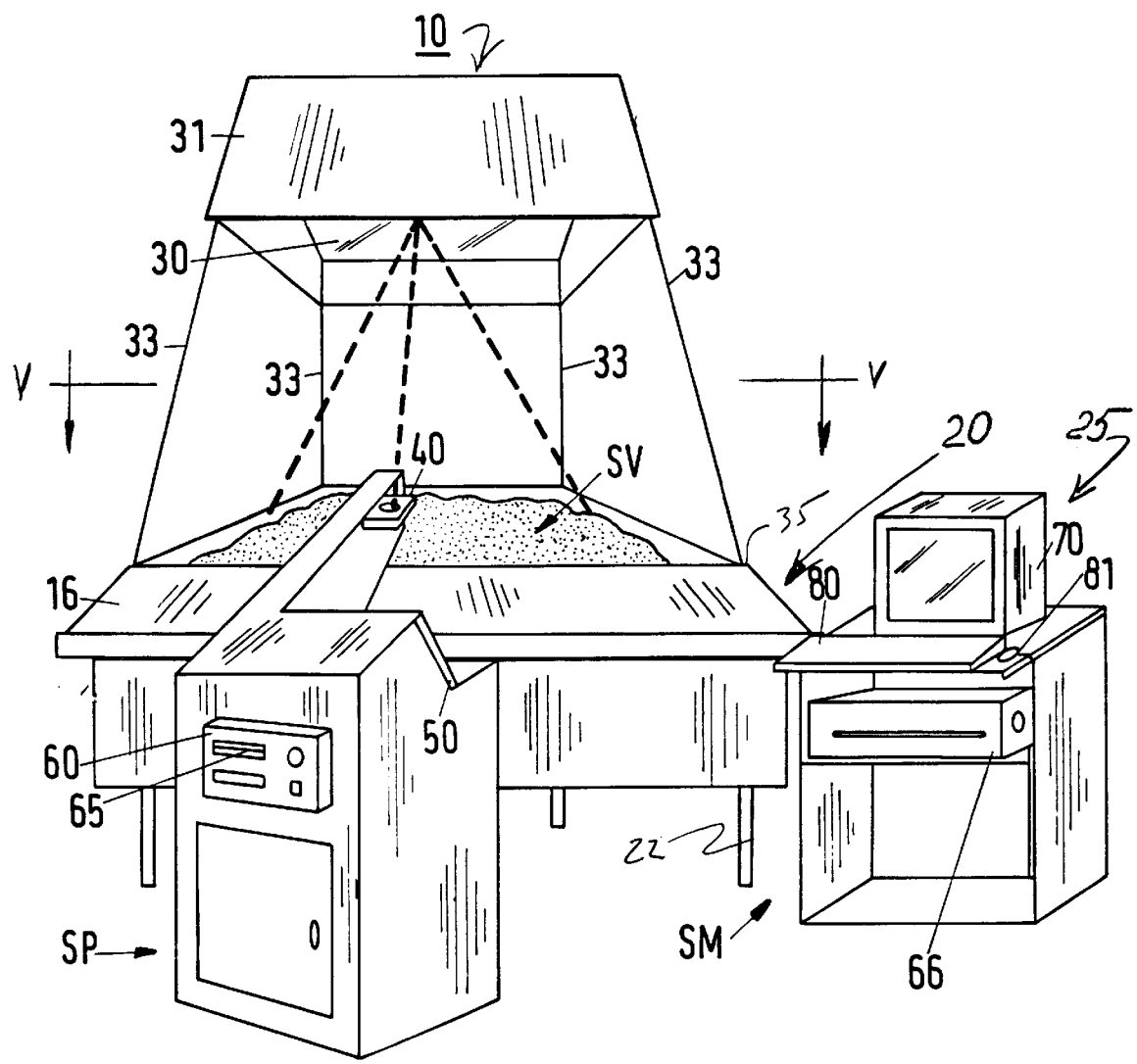
FIG. 1 is a perspective view of the training sand box made in accordance with the concepts of the present invention.
Figure 2:
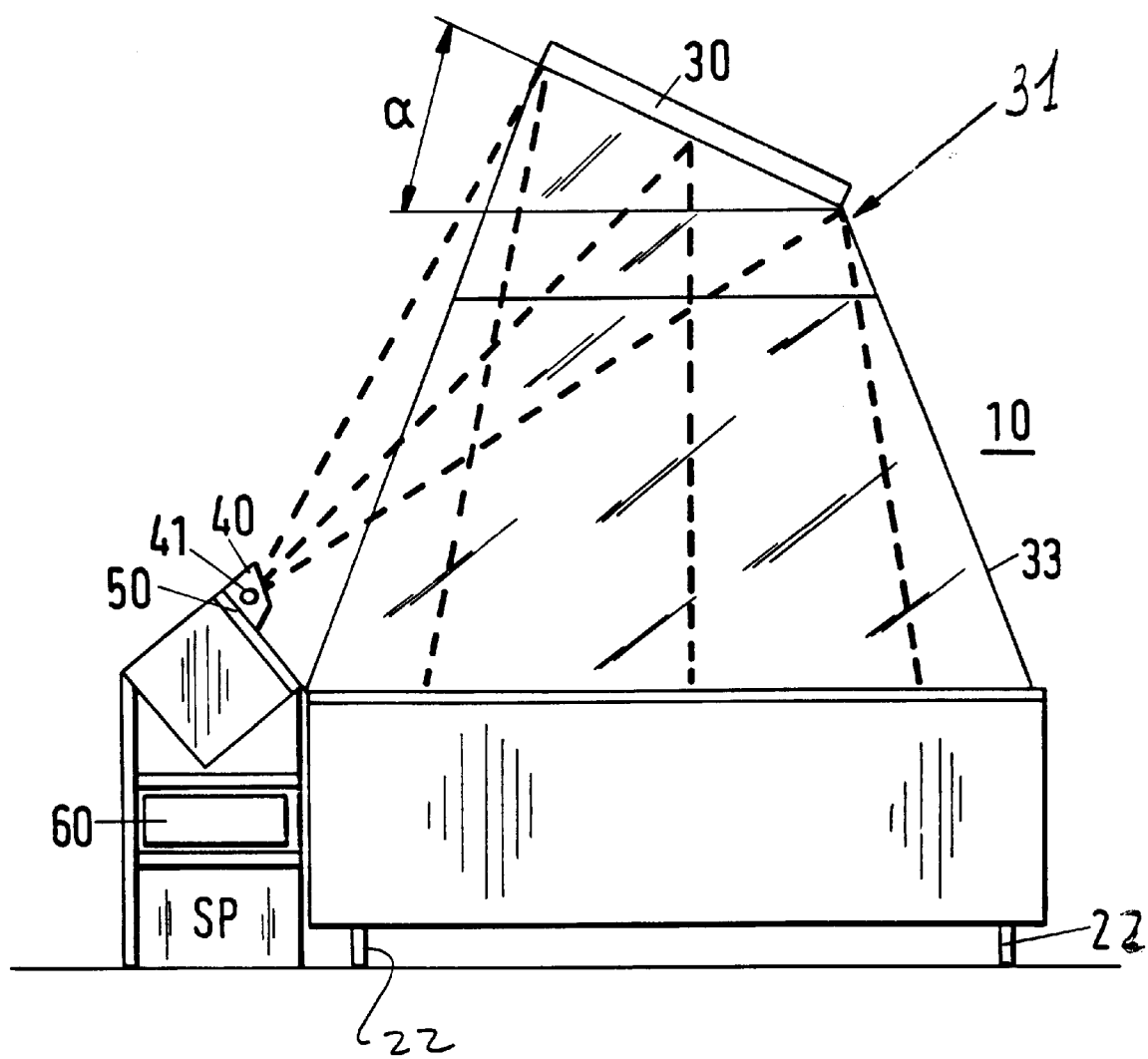
FIG. 2 is a side elevational view of the training sand box shown in FIG. 1.

Referring to FIGS. 1 and 2, a training sand box or tactical training device, made in accordance with the present invention, is illustrated, and generally designated with the numeral 10. The sand box includes a sand table, generally designated 20, a mirror hood, generally designated 31, and two equipment cabinets, SP and SM. The first cabinet SP includes the projector or overhead projector and associated electrical and electronic components. The second cabinet SM, to be described in more detail hereinafter, is used for the computer assisted control components, generally designated 25. The projector cabinet SP includes an overhead projector 40, a light source 41, shown in FIG. 2, and a computer controlled image creating unit, such as a liquid crystal display (LCD) unit 50. A central processing unit, or computer 60, is mounted within the projector cabinet for control of the projector. Cabinet SM includes a CRT or monitor 70, a control panel or keyboard 80, and a cursor control or mouse 81, which are interconnected with the computer 60, as shown in the block diagram or circuit diagram of FIG. 3 and connected to the printer 66, also mounted in the equipment cabinet SM. Therefore, the major modular components of the training sandbox 10 of the present invention can be seen to provide the expanded, and flexible training sandbox, which is a computer assisted multi-role simulation and training device.

Figure 3:
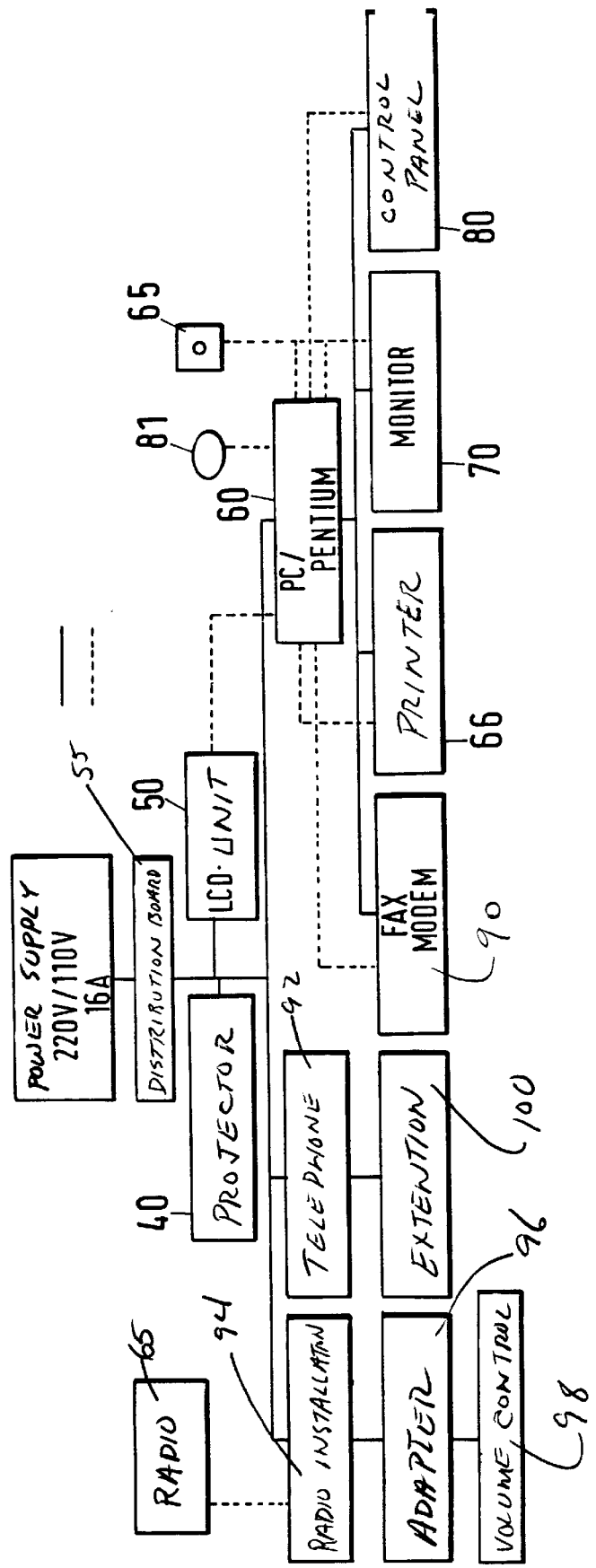
FIG. 3 is a block diagram of the control system of the training sand box shown in FIG. 1.

The various electronic components and necessary electrical connection circuitry for these modules, as well as for the required power supply and connecting lines between the modules and electronic components are, for simplicity, depicted as a circuit block diagram showing the structure and interconnections in FIG. 3.

Referring again to FIGS. 1 and 2, the sand box 20 is generally square in plan view and contains a volume of sand SV, as shown in FIG. 1. The sand box 20 of the present invention, which is sometimes referred to as a sand table, because the generally upper horizontal surface of the volume of sand, is elevated to a convenient height for the user, which is similar to the height of a typical table. The volume of sand is held in a "sand box" constructed in the general shape of a rectangular solid, and includes four similarly shaped or identical components 11, which are assembled as shown in FIGS. 4 and 6.

Figure 4:
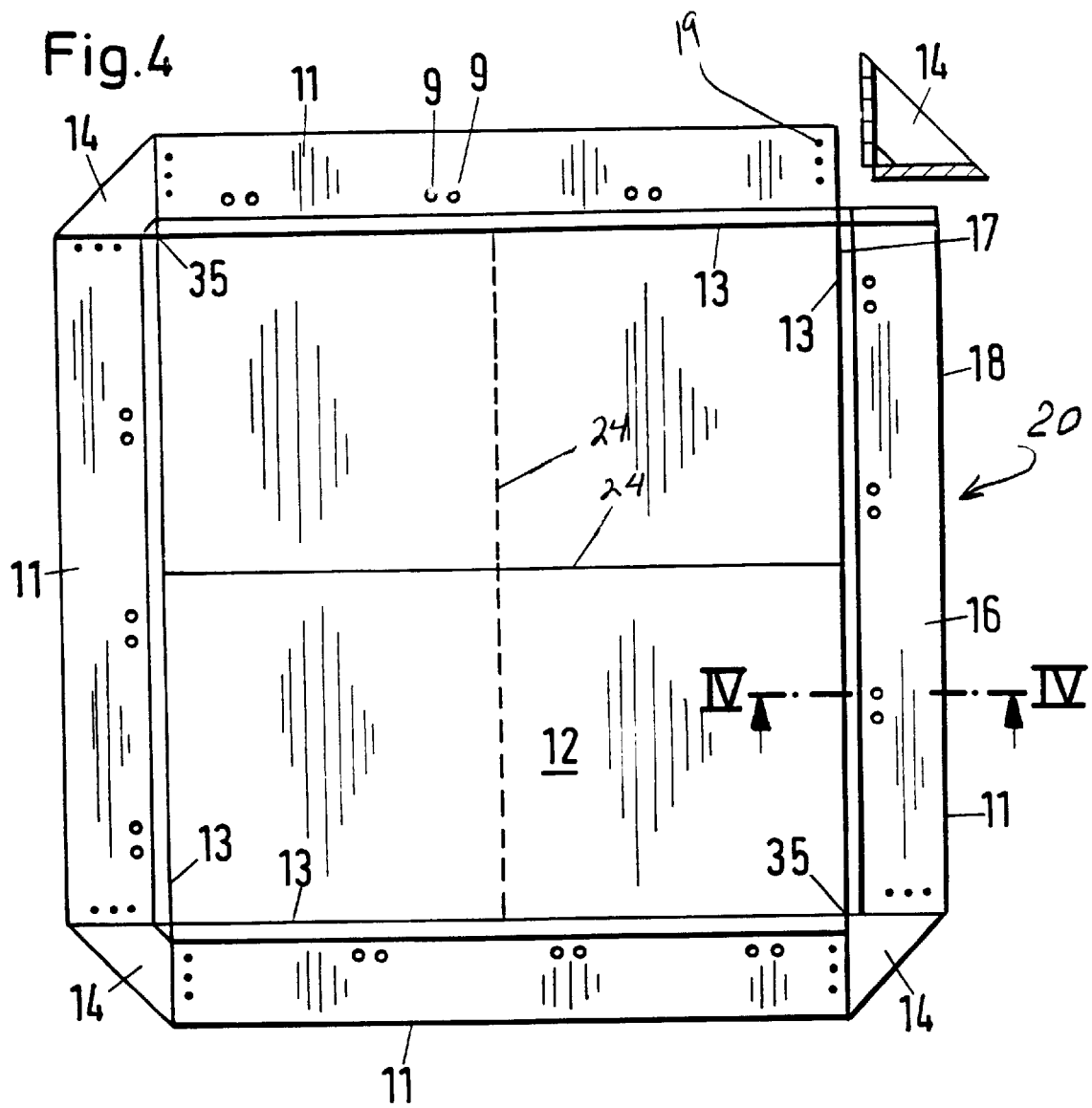
FIG. 4 is a top plan view of the training sand box, taken generally along line V—V of FIG. 1.
Figure 5:
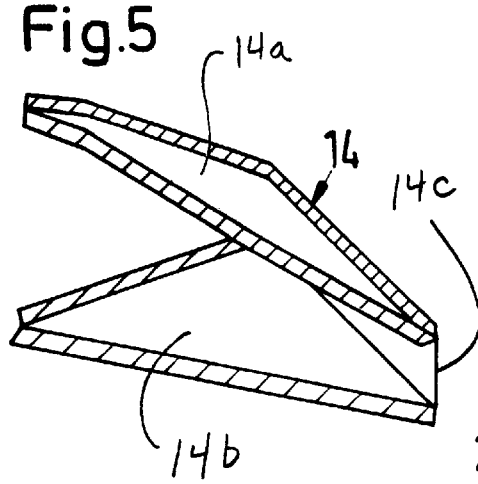
FIG. 5 is a perspective view of one corner piece used in the training sand box construction as shown in FIG. 1.
Figure 6:
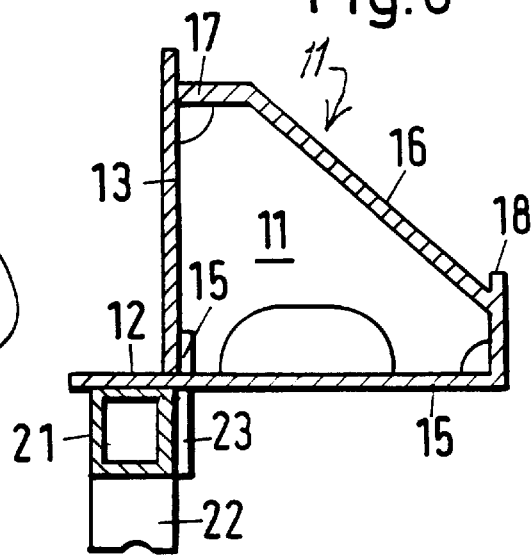
FIG. 6 is a partial vertical section of the training sand box, taken generally along line IV—IV of FIG. 4.

According to the drawings of FIGS. 4 and 6, each component 11, includes a generally horizontal base plate portion 12, a vertical side wall portion 13, and a horizontal extension 15, which extends outwardly past the side wall 13. A sloping surface 16 merges near the top of the side wall 13 into a ledge surface 17 at one end, and includes a support edge 18 on a vertical section so as to extend slightly above the upper outer surface of the sloping surface 16. Each base plate 12 is of a depth equal to half of the inner dimension of the sand box, so that as can be seen in FIG. 4, the base plates 12 lie on top of one another in pairs, such that in the assembled state, the inner front edges of opposite base plates 12 fit flush together. The same is true for the edges of the side walls 13 with their outer edges which respectively form the vertical corners of the "box" portion that is filled with sand. A corner piece 14, as shown in FIG. 5, is formed of similar sheet material having a sloping surface 14a, a horizontal, triangular surface 14b and a vertical portion 14c to provide a smooth, ergonomic corner and interconnection between the sloped surface 16 and ledge 17 of adjacent components 11. The corner pieces 14 are connected a the respective edges of the components 11 by suitable connection means 19. The junction regions 24 between the edges of the base plates 12 are sealed with a sealing compound, such as silicon rubber or the like. In a typical construction, the components 11 and corner pieces 14 are formed of sheet steel, or a similar material. A finish of reinforced plastic or other type of material can be applied to the components for aesthetic, corrosion-resistant, or other reasons.

As shown in FIGS. 1 and 2 in particular, the training sand box 12 rests and is elevated to a convenient height by a base made of steel rods that are generally square in cross-section. The base consists of a generally square supporting frame 21, shown in FIG. 6, which is mounted by four plug-in legs 22. The outside dimensions of the supporting frame 21 correspond to the outside dimensions from side wall to side wall of the assembled components 11. Attachment means, such as clips 23, are fastened in the corner regions of the supporting frame in such a way that they can be released out of engagement from recesses 15 when the sand box is assembled and disassembled. In this way, an interlocking connection is achieved between the sand box and the supporting frame. Although the training sand box of the present invention can be of any size, it has been found that a two meter by two meter square sand box 10 works well in typical situations.

Referring again to FIGS. 1 and 2, the previously described mirror hood 31 includes a trapezoidal deflecting mirror 30 for receiving a projected image and illuminating or directing the image onto the generally horizontal surface of the volume of sand SV. The mirror 30 is preferably surrounded by an opaque hood 31 which prevents ambient light, such as daylight or background light, from interfering with the desired image. The hood 31 is carried on or supported by a four-legged framework 33 mounted on the four corners 35 of the sand box 20. The described framework provides a trapezium with the broader base sides connected to the sand box and the narrow top side connected to the deflecting mirror 30. The deflecting mirror 30 is preferably mounted in a conventional manner on a framework or legs 33 so as to be adjustable generally about the rearward edge through an angle of alpha($\alpha$) with respect to the horizontal plane of the sand table 20. The sides between the legs 33 may be closed by transparent plastic or glass, if desired.

Referring to FIGS. 1 and 2 again, the overhead projector 40 is mounted in the projector cabinet SP and arranged adjacent to the sand table 20 and serves, in conjunction with the deflecting mirror 30, to project images, such as still pictures of a recorded terrain data, generally as shown by the dotted lines, onto the surface of the sand. These images are generated by means of the LCD unit 50, master pictures, grids and the like. The sand surface SV also serves to assist in the realistic reproduction of the terrain to be simulated, for example, on the basis of a map representation and the contours of the generally horizontal surface of the sand contained in the sand table 20. In addition, moving sequences of vehicles, marching columns of troops and the like, as well as clouds, fires, changes in the current situation, may be displayed by means of the LCD unit and projected onto the sand surface. Finally, aerial views can also be projected onto the sand surface, such as for the purposes of updating a represented or simulated exercise event. As often desirable, with the current modulation of the sand box 20, to superimpose the earlier appearance of terrain. In this case, one of the side walls 13 of one of the components 11 may be provided with a known unfurling projection screen which can, if necessary, be stretched over the surface of the sand, and connected to the opposite side wall 13. It is also possible to provide a removable board for this purpose which can be simply mounted between the framework 13 on the effective surface of the sand box as shown in FIG. 4.

For additional capabilities and flexibility, the projection cabinet SP additionally comprises the above-mentioned LCD unit 50 which allows the distortion-free, high-definition color depiction of still and/or moving pictures and the blending in or addition of visual target markings in a surprisingly simple and easy manner. The information for these depictions is delivered by a CPU which, in FIG. 3, is shown as a pentium PC 60 connected by a dotted line to the LCD unit 50. The data or information for these depictions may be provided by various sources, such as a diskette 65, a CD-ROM, or other media. This data is processed by the PC 60 and can be depicted with any desirable variation. These depictions are projected via the deflecting mirror 30 onto the surface of the sand SV through the lens of the projector 40 in a conventional way and need not be depicted in any greater detail in this description. The images or pictures are formed by controlling and changing the flat-line magnetic field on the LCD in a typical manner so that they are projected via the deflecting mirror 30 onto the surface of the sand, such that they are approximately 2 meters by 2 meters in size.

As the effective surface of the sand is modulated or contoured in accordance with the terrain to be depicted, the resulting depictions appear to be three-dimensional and very realistic to the viewer. The LCD unit 50 can thus deliver moving pictures, as well as a movable marking or item in the form of a symbol which is likewise projected via the deflecting mirror 30 onto the surface of the sand. A cursor control 81, such as a mouse or joy stick, is connected to the computer 60, and permits moving or sweeping of the markings or symbols manually or in conjunction with a control program which previously has been installed on the computer 60. Thus the symbols or markings can be moved in all directions over the image depiction supplied by the LCD unit 50 and over the entire surface of the sand. In this way, it is possible in an extremely simple manner to project controllable, visual target markings onto the surface of the sand.

Any coordinates which are necessary for depiction are stored in the control program or input via the control panel 80, which like the cursor 81, is removably mounted on the cabinet SM adjacent the sand box or sand table 20. A monitor 70 is also located on the equipment cabinet SM and connected to the PC 60 which is capable of displaying the values read in or input at the time and displayed by means of the LCD unit 50. Additionally, via the control panel 80, functions such as switching off and on, lighting, brightness control, and similar parameters, such as, for example, the radio speech traffic to be simulated in training can likewise be varied. As previously mentioned, the complete circuit arrangement of the assemblies described above, need not be shown in further detail, since their interconnection and interaction can be seen from the block circuit diagram shown in FIG. 3. Each of the previously described components are depicted as small boxes and labels and the electrical supply or wire connections are shown as solid lines, and the control is shown as dashed lines. In addition to the elements previously described, a fax modem 90 may be provided so that information can be electronically transmitted and received by the PC 60. The PC is also connected to a telephone 92 and a radio installation 94. The radio installation is connected to a radio set 65 which is controlled by the PC 60 so that radio speech or traffic to be simulated can be manually or automatically controlled. Similarly, the radio installation 94 is connected via an adapter 96 to a volume control 98 to again permit manual or automatic control of the volume. The telephone 92 is connected to a telephone connection 100 which may be on an internal or external communication line. Individual cable connections between the equipment cabinets SP and SM and the sand table 20 have not been depicted for the sake of clarity but would be connected in a conventional manner as is known in the art to the individual modules by releasable, plug-in connections.

As can be seen from FIG. 3, the LCD unit 50 is driven and controlled by the PC 60 to which a monitor 70, a printer 66, and a fax modem 90 are connected. Of course, it would be possible to also interconnect a fax machine in a conventional manner. The various connection devices, as described above, such as the radio and telephone appliances, adaptor, volume control, and the like, are diagrammatically depicted in the figure as is the diskette which serves as an example of the data medium. A distribution board 55 is provided for use where one control system is used to control two or more of the training sand box/projector combinations and monitors which could be remotely located.

As can be understood, the PC 60 may be programmed in a conventional manner or with commercially available software to create and/or generate an infinitely variable number of interactive scenes or images for projection onto the surface of the sand. As is known, the surface of the sand can be modulated and contoured in any desired fashion to present an extremely realistic, three-dimensional view of a section of terrain, or other desired surface, for training purposes. The PC 60 controls the image creating unit so that complex still and/or moving images can be created to provide extremely realistic training simulations.

The foregoing detailed description has been given for clearness of understanding only and no unnecessary limitations should be understood therefrom as many modifications would be obvious to those skilled in the art.

I claim:

1. An interactive sand box for tactical training, comprising:
   means for supporting a volume of sand which can be contoured to depict a particular formation;
   a stationary reflecting mirror mounted above the upper surface of the sand, means for projecting an image onto the surface of the sand;
   a controller;
   means for creating an image for optically representing images, data, and other information which can be projected via the projector onto the surface of the sand to create automated or manually variable realistic terrains for use in training.

2. The interactive sand box of claim 1 wherein the controller is a computer.

3. The interactive sand box of claim 1 including a monitor for simultaneous depiction of the images and data supplied by the computer to the image creating means.

4. The interactive sand box of claim 1 wherein a cursor is connected to the controller for blending symbols into the image depiction supplied by the computer.

5. The interactive sand box of claim 1 wherein the reflecting mirror, projector, means for creating an image, controller, means for holding a volume of sand are separate modules and electrically connected to one another.

6. The interactive sand box of claim 5 wherein the computer takes the form of a personal computer.

7. The interactive sand box as claimed in claim 1 wherein the reflecting mirror is mounted for pivotal movement so as to be adjustable.

8. An interactive sand table arrangement, comprising:
   means for supporting a volume of sand;
   a reflective mirror mounted above the surface of the sand;
   a projector for projecting an image onto the surface of the sand;
   means for creating an image for optically representing images, data and other information; and
   a programmable central processing unit for controlling the image and the projector to project an image on the surface of the sand to create variable, realistic terrains for use in training.

9. The sand table arrangement of claim 8 including a cursor connected to the central processing unit for blending symbols into the image depiction.

10. The sand table arrangement of claim 9 wherein the reflecting mirror is pivotally mounted to permit angular adjustment relative to the horizontal.

11. An interactive sand box for tactical training, or the like, comprising:
   a rectangular base for supporting a volume of sand which can be contoured to depict a particular terrain;
   a plurality of legs for supporting the frame at a predetermined height;
   a pivotally mounted reflecting mirror supported above the surface of the sand;
   means for projecting an image toward the mirror for reflecting onto the upper surface of the sand volume;
   a programmable central processing unit; and
   a liquid crystal display unit connected to the projector to create still and moving images to be projected onto the surface of the sand to create variable, realistic terrains for use in training.

12. The interactive sand box of claim 11 including a monitor for simultaneous depiction of the images and data supplied by the central processing unit to the projector.

13. The interactive sand box of claim 12 including a cursor connected to the central processing unit for blending symbols into the image depiction supplied by the central processing unit to the liquid crystal display unit.

14. The interactive sand box of claim 13 including a printer for printing the image being projected onto the surface of the sand.

15. The interactive sand box of claim 14 including means for electronically transmitting the image to a remote location.

16. The interactive sand box of claim 15 including means for generating an audio signal for use in training.

17. The interactive sand box of claim 16 including a distribution means for simultaneously delivering the signals from the central processing unit to a plurality of remote projector/sand box units.

* * * * *